United States Patent Office 3,396,132
Patented Aug. 6, 1968

3,396,132
POLYVINYL CHLORIDE STABILIZED WITH MIXTURES COMPRISING MAGNESIUM SALT, ZINC SALT AND POLYOL
Norman L. Perry, Wayne, and Mark W. Pollock, Teaneck, N.J., assignors to Argus Chemical Corporation, Brooklyn, N.Y., a corporation of New York
No Drawing. Continuation of application Ser. No. 211,877, July 23, 1962. This application June 2, 1965, Ser. No. 460,855
22 Claims. (Cl. 260—23)

This application is a continuation of Ser. No. 211,877 filed on July 23, 1962, now abandoned.

This invention relates to polyvinyl chloride resin compositions which have excellent heat stability and are safe for use in food packaging, stabilized by means of a stabilizing composition comprising a nontoxic magnesium salt, a nontoxic zinc salt and a nontoxic polyhydric alcohol.

In recent years a number of patents have issued showing how to stabilize polyvinyl chloride resins using organotin compounds. Among these patents are Nos. 2,883,363, issued Apr. 21, 1959; 2,872,468, issued Feb. 3, 1959; 2,870,182 and 2,870,119, issued Jan. 20, 1959; all to Leistner and Hecker; No. 2,914,506, issued Nov. 24, 1959, to Mack and Parker, and 2,801,258, issued July 30, 1957, to Johnson. Organotin compounds, because of their unusual heat stabilizing properties, have now set a standard for heat stability which remains unequaled. However, the organotin compounds have the disadvantage that they are toxic, and this limits their use to applications where toxicity is not a problem. Moreover, most of these compounds are liquids, and therefore of limited utility with rigid vinyl polymers.

In accordance with the instant invention, polyvinyl chloride resins which are safe for use in food packaging and which have remarkable heat stability at elevated temperatures are obtained using, as the stabilizer, a magnesium-zinc salt combination comprising at least one magnesium salt and at least one zinc salt together with a polyol. The anion portion of the magnesium and zinc salts can be derived from benzoic acid and from fatty acids derived from edible fats and oils. This invention encompasses stabilizers comprising magnesium and zinc benzoates plus a polyol, magnesium and zinc fatty acid salts plus a polyol, and mixtures of magnesium and/or zinc benzoates and magnesium and/or zinc fatty acid salts, plus a polyol. Good stability for long-term heating is imparted by this combination.

Because the stabilizer combination is a solid, this stabilization is obtainable without deterioration of any of the other properties of the resin. The compositions of the invention are stable at the extraordinarily high temperatures which are required in the case of rigid polymers, as compared to plasticized polyvinyl chloride resins, i.e., at temperatures of 375° F. and higher for 45 minutes and longer. They also are safe to use in food packaging, which makes it possible to use the rigid nonplasticized polyvinyl chloride resin compositions of the invention in the fabrication of food containers.

The stabilizer composition of the invention is far more effective than any of the ingredients thereof taken alone or in pairs, showing that the combination of all three components, i.e., the magnesium and zinc salts and the polyol give a synergistic effect. Combinations, for example, of a magnesium salt and a polyol, of a zinc salt and a polyol, and of a magnesium and a zinc salt, are not sufficiently effective at the elevated processing temperatures, i.e., 375° F. and higher, required in the processing of rigid polymers to be used as stabilizers. In addition, the synergistic combination of this invention gives better results at lower temperatures than do the individual components.

Combinations of zinc stearate or magnesium stearate and polyols are disclosed either directly or by inference in Patent No. 2,711,401 to Robert E. Lally, patented June 21, 1955.

The stabilizer compositions of this invention comprise from about 25 to about 40 parts of magnesium salts, from about 25 to about 40 parts of zinc salts, and from about 20 to about 50 parts of the polyhydric alcohol. It will be understood that the term "salt" refers to the magnesium and zinc salts of benzoic acid and of the fatty acids derived from edible fats and oils. Exemplary are the mixed fatty acids derived from tallow, lard, sardine oil, olive oil, coconut oil, cottonseed oil, soyabean oil, corn oil and peanut oil. The oils from which the fatty acids are derived may be hydrogenated if desired. Also useful are distilled, fractionated fatty acids or mixtures of fatty acids derived from such fats and oils.

Any nontoxic polyols can be employed in the stabilizer compositions of this invention. Thus, any nontoxic aliphatic compounds having at least two and preferably not more than ten hydroxyl groups can be used. Particularly preferred polyols are mannitol, sorbitol and glycerol. Pentaerythritol, which has not yet been granted approval for use in food packaging, is effective in the stabilizer compositions of the invention, and can be employed in food packaging operations if and when approval is granted by the appropriate governmental authorities.

The amount of the stabilizer composition added to the resin should be sufficient to permit heating of the stabilized polyvinyl chloride resin composition at 375° F. for the required time without the development of heat decomposition. Usually, from 2 to 6% stabilizer composition by weight of the resin will be sufficient to meet most needs and uses. Sufficient resistance to heat deterioration can be obtained employing only small amounts of the stabilizer composition, for example, about 0.25% by weight of the resin. The more stabilizer employed, the better the resistance to heat deterioration. Amounts beyond about 10% of stabilizer composition are generally unnecessary and hence may be wasteful. Where plasticized resins are being stabilized, less stabilizer is required and usually no more than about 3% by weight of the resin need be used.

The stabilizing effect of the stabilizer compositions of this invention can be enhanced by the addition thereto of small quantities of nontoxic antioxidants. Where such antioxidants are employed, they should not be used in amounts greater than about 0.5% of the resin composition. Any known antioxidant can be employed, provided it is nontoxic in the proportions used. Representative antioxidants include 2,6-di-t-butyl-4-methylphenol, 2-t-butyl-4-methoxyphenol, 3-t-butyl-4-methoxyphenol, n-propyl gallate, n-dodecyl gallate, dilauryl thiodipropionate and nordihydroguaiaretic acid.

The following antioxidants are also believed to be nontoxic in small quantities, but have not yet been approved by the appropriate government authorities: 4,4'-methylene bis-(2,6-di-t-butylphenol), 4,4'-thiobis-(2-t-butyl-5-methylphenol), 4,4'-butylidene bis-(2-t-butyl-5-methylphenol), 1,1,3-tris-(3-t-butyl-4-hydroxy-6-methylphenyl) butane, 2,2'-methylene bis-[4-methyl-6-(1'-methylcyclohexyl)phenol] and 2,2'-methylene bis-(4-nonylphenol).

The invention is applicable to any polyvinyl chloride resin. The term "polyvinyl chloride" as used herein is inclusive of any polymer formed at least in part of the recurring group:

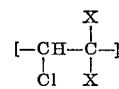

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Patent No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene. The invention is of particular application to the stabilization of rigid polyvinyl chloride resin compositions, that is, resin compositions which are formulated to withstand high processing temperatures, of the order of 375° F. and higher.

However, the stabilizer compositions of the invention can be used with plasticized polyvinyl chloride resin compositions of conventional formulation where resistance to heat distortion is not a requisite. Conventional plasticizers well known to those skilled in the art can be employed such as, for example, dioctyl phthalate, octyl diphenyl phosphate and epoxidized soybean oil.

The preparation of the stabilized resin composition is easily accomplished by conventional procedures. The selected stabilizer system ordinarily is blended with the polyvinyl chloride resin using, for instance, plastic mixing rollers at a temperature at which the mix is fluid and thorough blending facilitated, milling the stabilizer system with the resin on a two roll mill at from 300 to 400° F. for a time sufficient to form a homogeneous sheet. The plasticizer, if one is employed, can be incorporated with the stabilizer. Usually five minutes milling time is adequate. After the mass is uniform, it is sheeted in the usual way.

The following examples in the opinion of the inventors constitute preferred embodiments of their invention.

EXAMPLE 1

A series of resin compositions was prepared, each containing 150 parts of Geon 103EP polyvinyl chloride homopolymer blended with stabilizers as noted in Table I on a two roll mill up to 375° F. Each sample was then divided into two portions, one portion of each being heated at 350° F. and the second portion at 375° F., in an air oven, to determine heat stability. The discoloration was noted and is reported in Table I.

utes of heating at 350° F. When the zinc salts of tallow fatty acids and mannitol are employed in a polyvinyl chloride resin composition (Samples C and D), the composition turns black upon heating for 45 minutes at 375° F. (30 minutes for Sample D) or for 120 minutes at 350° F. By contrast, when the stabilizing combination of this invention is employed (Sample F) using magnesium benzoate, zinc salts of tallow fatty acids and mannitol together as the stabilizing combination, the composition remains yellow and transparent after 45 minutes of heating at 375° F. and 120 minutes of heating at 350° F. This indicates the synergistic nature of the combination, since the stabilizing combination using all three components, a magnesium salt, a zinc salt and a polyol, gave a substantial and better stabilizing effect than did compositions containing only two of the components.

EXAMPLE 2

A series of compositions was made up as in Example 1 employing a copolymer of 96% vinyl chloride and 4% vinyl acetate. Similar advantages for the three component systems of this invention were obtained.

EXAMPLE 3

A series of compositions was prepared as in Example 1 substituting glycerol for mannitol. Similar advantages were obtained from the three component systems.

EXAMPLE 4

A stabilizer composition was prepared composed of 1.5 parts of mannitol, 1.5 parts of the magnesium salts of tallow fatty acids and 1.5 parts of the zinc salts of tallow fatty acids. This stabilizer composition was then blended with 150 parts by weight of Geon 103EP resin on a two roll mill. The composition was then divided in two parts, one part being held in an air oven at 350° F. and the other in an air oven at 375° F. to determine heat stability. The color noted is reported in Table II below.

TABLE II

Heating discoloration at 350° F.:
    Initial _____ pale yellow
    After 30 minutes of heating _____ yellow
    After 60 minutes of heating _____ yellow
    After 120 minutes of heating _____ yellow Heating discoloration at 375° F.:
    Initial _____ pale yellow
    After 15 minutes of heating _____ yellow
    After 30 minutes of heating _____ yellow
    After 45 minutes of heating _____ yellow

TABLE I

| Sample | Stabilizer Composition, Parts by Weight | | | Heat Discoloration at 350° F. (Minutes of heating) | | | | Heat Discoloration at 375° F. (Minutes of heating) | | | | |
|---|---|---|---|---|---|---|---|---|---|---|---|---|
| | Magnesium Benzoate | Zinc Salts of Tallow Fatty Acids | Mannitol | 0 | 30 | 60 | 120 | 0 | 15 | 30 | 45 | 60 |
| A | | | | White | Dark Brown | Black | Black | White | Black | Black | Black | Black |
| B | | 3.0 | 1.5 | Tan | Yellow | Yellow | do | Tan | Yellow | Yellow | do | Do |
| C | 3.0 | | 1.5 | Orange | Red | Dark Red | Dark Brown | Orange | Dark Red | Dark Red | do | Do |
| D | | 1.5 | 1.5 | Tan | Yellow | Yellow | Black | Tan | Yellow | Charred | do | Do |
| E | 1.5 | | 1.5 | Orange | Red | Brown | do | Orange | Dark Red | Black | do | Do |
| F | 1.5 | 1.5 | 1.5 | White | Yellow | Yellow | Yellow | White | Yellow | Yellow | Yellow | Charred |

The results indicated in Table I show clearly that when magnesium benzoate and mannitol are added to polyvinyl chloride resin, (Samples C and E), there is an immediate discoloration upon heating so that after only 15 minutes of heating at 375° F., the composition assumes a dark red color. The same dark red color (brown in the case of Sample E) is observed after only 60 min-

EXAMPLE 5

The procedure of Example 4 was repeated using as the stabilizer, a stabilizing composition consisting of 1.5 parts of sorbitol, 1.5 parts of magnesium benzoate and 1.5 parts of zinc salts of tallow fatty acids. The results obtained are reported below in Table III.

TABLE III

Heat discoloration at 350° F.:
 Initial _____ white
 After 30 minutes of heating _____ yellow
 After 60 minutes of heating _____ yellow
 After 120 minutes of heating _____ yellow Heat discoloration at 375° F.:
 Initial _____ white
 After 15 minutes of heating _____ yellow
 After 30 minutes of heating _____ yellow
 After 45 minutes of heating _____ yellow The results of Examples 4 and 5 show that other stabilizing compositions coming within the scope of this invention also are satisfactory in giving stabilization at 375° F. for at least 45 minutes and in giving stabilization at 350° F. for at least 2 hours.

EXAMPLE 6

Example 5 was repeated using as the polyol, pentaerythritol. Equivalent results were obtained. Thus, pentaerythritol is an equivalent of the other nontoxic polyols, but it would not be employed in the U.S.A. in stabilizer compositions of the invention at the present time where the product is to be used for food packaging because pentaerythritol has not yet been accepted as safe for this use.

EXAMPLE 7

Three stabilizer compositions were prepared. Each contained 1.5 parts of mannitol, 1.5 parts of magnesium benzoate and 1.5 parts of zinc salts of tallow fatty acids. 0.15 part of an antioxidant which was nontoxic in the proportions employed, was then added to each of the stabilizer compositions. Each stabilizer composition was then blended with 150 parts by weight of a Geon 103EP polyvinyl chloride homopolymer resin on a two roll mill. The antioxidant employed in each case and the results obtained upon heating the resin composition in an air oven at 350° F. and at 375° F. are noted in Table IV. Samples A and F from Table I are also included in Table IV as a comparison.

determine heat stability as evidenced by discoloration. The results obtained are recorded in Table V.

TABLE V

Initial _____ white
After 15 minutes of heating _____ yellow
After 30 minutes of heating _____ yellow
After 45 minutes of heating _____ yellow
After 60 minutes of heating _____ yellow
After 75 minutes of heating _____ dirty yellow The use of this stabilizer composition in polyvinyl chloride resin thus yielded good resistance to heat deterioration at 375° F. for at least one hour.

EXAMPLE 9

The procedure of Example 8 was repeated using zinc benzoate in place of zinc tallow fatty acid salts and the magnesium salts of coconut oil fatty acids in place of magnesium benzoate. Equivalent results were obtained.

EXAMPLE 10

The procedure of Example 8 was repeated using as the magnesium salt, the magnesium salts of corn oil fatty acids and as zinc salts, the zinc salts of corn oil fatty acids. Equivalent results were obtained.

EXAMPLE 11

A stabilizer combination was made up employing 3 parts of magnesium benzoate, 5 parts of zinc salts derived from tallow fatty acids, 4 parts of mannitol and 0.4 part of 2,6 di-t-butyl-4-methylphenol. Two parts of this stabilizer combination were then blended with 100 parts of Dow 111–4 polyvinyl chloride homopolymer plasticized with 45 parts of dioctyl phthalate and 5 parts of epoxidized soybean oil. Good stabilization was obtained for two hours of heating at 350° F.

EXAMPLE 12

The procedure of Example 8 was repeated, substituting hydrogenated peanut oil fatty acid salts of zinc for the tallow fatty acid salts. A polyvinyl chloride resin composition containing this stabilizer composition remained yellow after 45 minutes of heating at 375° F.

TABLE IV

| Sample | Antioxidant | Heat Discoloration at 350° F. (Minutes of heating) | | | | Heat Discoloration at 375° F. (Minutes of heating) | | | | | |
|---|---|---|---|---|---|---|---|---|---|---|---|
| | | 0 | 30 | 60 | 120 | 0 | 15 | 30 | 45 | 60 | 75 |
| G | 2,6-di-t-butyl-4-methylphenol | White | Yellow | Yellow | Yellow | White | Yellow | Yellow | Yellow | Yellow | Charred |
| H | 4,4'-methylene bis(2,6-di-t-butylphenol) | do | do | do | do | do | do | do | do | do | Do. |
| J | 4,4'-thiobis(2-t-butyl-5-methylphenol) | do | do | do | do | do | do | do | do | do | Black. |
| A | Control (no stabilizer and no antioxidant) | do | Dark Brown | Black | Black | do | Black | Black | Black | Black | Do. |
| F | None | do | Yellow | Yellow | Yellow | do | Yellow | Yellow | Yellow | Charred | Do. |

From the foregoing data, it can be observed that the use of a small quantity of an antioxidant serves to increase the stabilizing effect of the combination thereby increasing the useful life of the resin at 375° F. by at least 15 minutes, an important factor under many processing conditions. The 350° F. test temperature was not sufficiently severe to show the synergistic effect that the antioxidant has on the stabilizer composition.

EXAMPLE 8

A stabilizer composition was prepared by mixing 5 parts of mannitol, 2.5 parts of magnesium benzoate, 4 parts of zinc salts derived from tallow fatty acids and 0.4 part of 2,6 di-t-butyl-4-methylphenol. 4.65 parts of this stabilizer composition was then blended with 150 parts by weight of a Geon 103EP polyvinyl chloride homopolymer on a two roll mill and the resultant resin composition was heated in an air oven at 375° F. to

EXAMPLE 13

The procedure of Example 12 was repeated using fatty acids derived from hydrogenated cottonseed oil in place of hydrogenated peanut oil fatty acids. Equivalent results were obtained.

EXAMPLE 14

Three stabilizer compositions were prepared. Each contained 1.5 parts of mannitol, 1.5 parts of magnesium benzoate and 1.5 parts of zinc salts of tallow fatty acids. 0.15 part of 2,6- di-t-butyl-p-cresol, which is nontoxic in the proportions employed, was then blended with each of the stabilizer compositions. Each stabilizer composition was then blended with 127.5 parts by weight of a Geon 103EP polyvinyl chloride resin homopolymer composition and 22.5 parts of each of the blending resins, as listed in Table VI below. A two roll mill was used at 350° F. The results obtained upon heating the resin compositions in an air oven at 350° F. and at 375° F. are noted in Table VI.

TABLE VI

| Sample | Blending Resin | Heat Discoloration at 350° F. (Minutes of heating) | | | | Heat Discoloration at 375° F. (Minutes of heating) | | | | | |
|---|---|---|---|---|---|---|---|---|---|---|---|
| | | 0 | 30 | 60 | 120 | 0 | 15 | 30 | 45 | 60 | 75 |
| K | Cycolac LT (acrylonitrile-butadiene-styrene polymer). | White. | Yellow. | Yellow. | Dark Yellow. | White. | Yellow. | Yellow. | Yellow. | Yellow. | Black. |
| L | KM 227 (graft copolymer of butadiene with methacrylate ester). | ..do.... | Light Orange. | Light Orange. | Light Orange. | ..do.... | Light Orange. | Light Orange. | Light Orange. | Charred. | Charred. |
| M | LD 313 (chlorinated polyethylene, 38% chlorine). | ..do.... | Pale Yellow. | Pale Yellow. | Pale Yellow. | ..do.... | Pale Yellow. | Pale Yellow. | Yellow. | Black. | Black. |

From the foregoing data, it can be observed that the stabilizer compositions of the invention are as effective with polyvinyl chloride resin blends as with the homopolymer alone at 350° F. and 375° F.

EXAMPLE 15

The procedure of Example 14 was repeated using as the resin an after-chlorinated polyvinyl chloride, Geon 600, and blending the stabilizer combination into the resin at 380° F.

TABLE VII

Heat discoloration at 350° F.:
  Initial _____ tan
  After 30 minutes of heating _____ tan
  After 60 minutes of heating _____ dark tan
  After 120 minutes of heating _____ dark tan
Heat discoloration at 375° F.:
  Initial _____ tan
  After 15 minutes of heating _____ dark tan
  After 30 minutes of heating _____ dark tan
  After 45 minutes of heating _____ dark tan
  After 120 minutes of heating _____ dark tan This example indicates that the stabilizer compositions of this invention give satisfactory stabilization to after-chlorinated polyvinyl chloride.

EXAMPLE 16

The procedure of Example 12 was repeated using olive oil fatty acids in place of peanut oil fatty acids. Equivalent results were obtained.

EXAMPLE 17

The procedure of Example 12 was repeated using lard fatty acids in place of peanut oil fatty acids. Equivalent results were obtained.

EXAMPLE 18

The procedure of Example 12 was repeated using sardine oil fatty acids in place of peanut oil fatty acids. Equivalent results were obtained.

Having regard to the foregoing disclosure, the following is claimed as the invention and patentable embodiments thereof:

1. A polyvinyl chloride resin stabilizer composition capable of improving the resistance of the resin to deterioration when heated at 375° F. comprising a mixture of magnesium and zinc salts of acids selected from the group consisting of benzoic acid and fatty acids derived from edible fats and oils, and a nontoxic aliphatic polyhydric alcohol having from two to ten hydroxyl groups, in the proportions from about 25 to about 40 parts by weight of zinc salt, from about 25 to about 40 parts by weight of magnesium salt and from about 20 to about 50 parts by weight of polyhydric alcohol.

2. A polyvinyl chloride resin stabilizer composition as in claim 1 comprising magnesium benzoate and the zinc salts of fatty acids derived from edible fats and oils.

3. A polyvinyl chloride resin stabilizer composition as in claim 1 wherein the magnesium and zinc salts are salts of fatty acids derived from edible fats and oils.

4. A polyvinyl chloride resin stabilizer composition as in claim 1 wherein the polyhydric alcohol is selected from the group consisting of glycerol, sorbitol and mannitol.

5. A polyvinyl chloride resin stabilizer composition as in claim 1 wherein the fatty acids are derived from tallow.

6. A polyvinyl chloride resin stabilizer composition as in claim 1 wherein the fatty acids are derived from coconut oil.

7. A polyvinyl chloride resin stabilizer composition as in claim 1 wherein the fatty acids are derived from cotton seed oil.

8. A polyvinyl chloride resin stabilizer composition as in claim 1 wherein the fatty acids are derived from corn oil.

9. A polyvinyl chloride resin stabilizer composition as in claim 1 wherein the fatty acids are derived from peanut oil.

10. A polyvinyl chloride resin stabilizer composition as in claim 1 wherein the fatty acids are derived from lard.

11. A polyvinyl chloride resin stabilizer composition as in claim 1 wherein the fatty acids are derived from sardine oil.

12. A polyvinyl chloride resin stabilizer composition as in claim 1 wherein the fatty acids are derived from olive oil.

13. A polyvinyl chloride resin stabilizer composition as in claim 1 also comprising up to about 200% by weight of a nontoxic antioxidant other than the composition of claim 1, effective in polyvinyl chloride resins.

14. A polyvinyl chloride resin composition having improved resistance to heat deterioration comprising a polyvinyl chloride resin and an amount within the range from about 0.25 to about 10% by weight of the resin of a stabilizer composition comprising a mixture of magnesium and zinc salts of acids selected from the group consisting of benzoic acid and fatty acids derived from edible fats and oils, and a nontoxic aliphatic polyhydric alcohol having from two to ten hydroxyl groups, in the proportions from about 25 to about 40 parts by weight of zinc salt, from about 25 to about 40 parts by weight of magnesium salt and from about 20 to about 50 parts by weight of polyhydric alcohol, the said stabilizer composition being present in an amount to improve the resistance of the resin composition to heat deterioration when heated at 375° F.

15. A polyvinyl chloride resin composition as in claim 14 in which the polyvinyl chloride resin is a polyvinyl chloride homopolymer.

16. A polyvinyl chloride resin composition as in claim 14 in which the polyvinyl chloride resin is a copolymer of vinyl chloride and vinyl acetate.

17. A polyvinyl chloride resin composition as in claim 14 in which the polyvinyl chloride resin is an after-chlorinated polyvinyl chloride.

18. A polyvinyl chloride resin composition as in claim 14 in which the polyvinyl chloride resin is a mixture of polyvinyl chloride homopolymer and chlorinated polyethylene.

19. A polyvinyl chloride resin composition as in claim 14 comprising magnesium benzoate and zinc salts of fatty acids derived from edible fats and oils.

20. A polyvinyl chloride resin composition as in claim 14 wherein both the magnesium and zinc salts are salts of mixed fatty acids derived from edible fats and oils.

21. A polyvinyl chloride resin composition as in claim 14 wherein the polyhydric alcohol is selected from the group consisting of glycerol, sorbitol and mannitol.

22. A polyvinyl chloride resin composition as in claim 14 also comprising up to about 0.5% by weight of a nontoxic antioxidant other than the composition of claim 14, effective in polyvinyl chloride resins.

References Cited

UNITED STATES PATENTS

| | | | |
|---|---|---|---|
| 2,711,401 | 6/1955 | Lally | 260—45.75 |
| 2,745,819 | 5/1956 | Mack et al. | 260—45.75 |
| 2,782,176 | 2/1957 | Darby et al. | 260—30.6 |
| 2,820,774 | 1/1958 | Myers et al. | 260—45.75 |
| 3,004,000 | 10/1961 | Kauder et al. | 260—45.75 |
| 3,262,896 | 7/1966 | Ackerman | 260—23 |

OTHER REFERENCES

"Compounding Ingredients for Rubber," 1961, pp. 119, 120, TS 1890 I 53.

Noller, "Chemistry of Organic Compounds," 1957, pp. 181, 182, QD 253 N 65.

Smith, British Plastics, May 1954, pp. 177, 178, TP 986 A I B 7.

DONALD E. CZAJA, *Primary Examiner.*

R. A. WHITE, *Assistant Examiner.*